Dec. 24, 1929.  M. O. DE CAMP  1,740,920
PARKING MECHANISM
Filed March 30, 1929  2 Sheets-Sheet 1
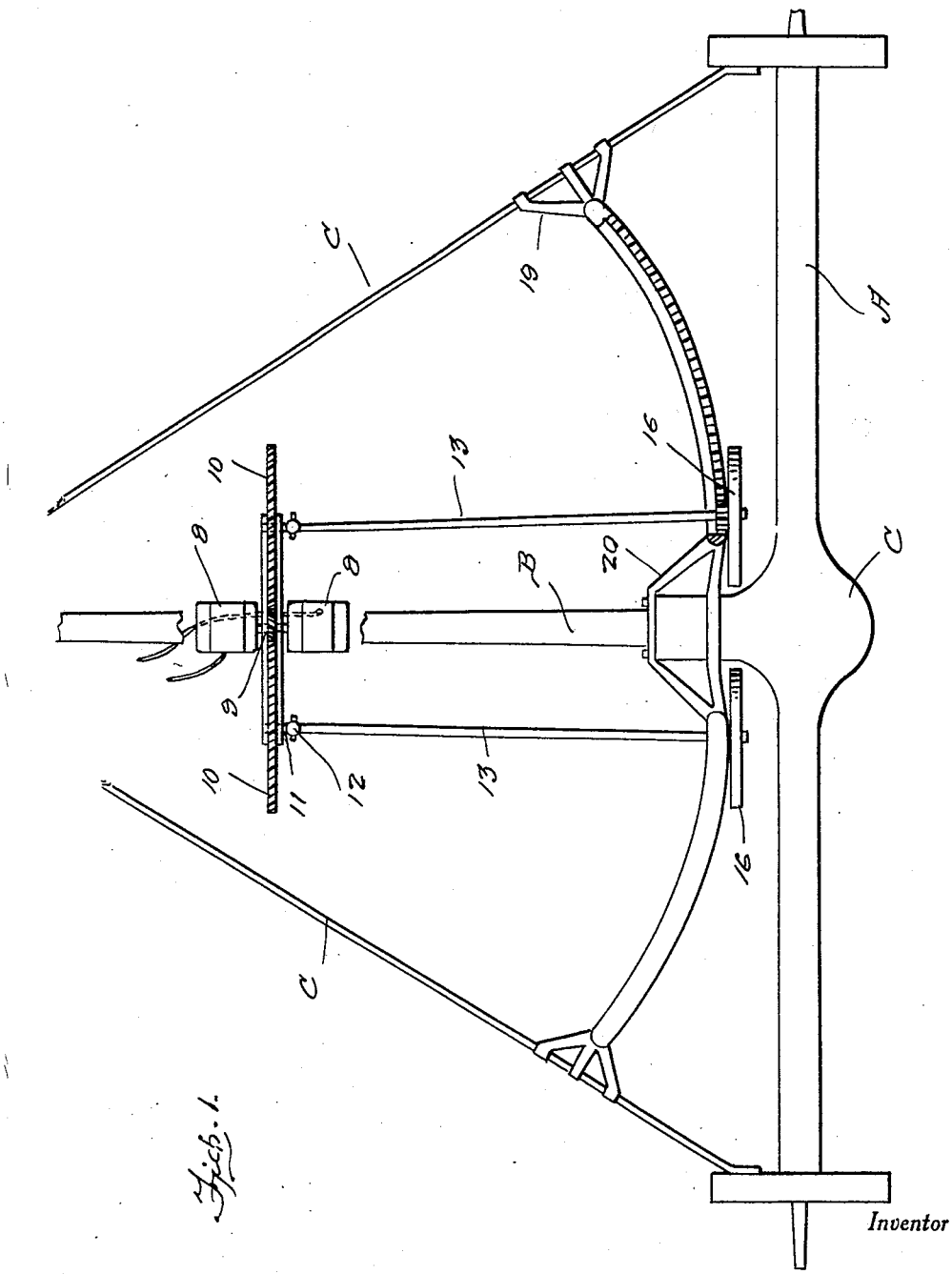
Inventor
Merrill O. De Camp
By Clarence A. O'Brien
Attorney Dec. 24, 1929.     M. O. DE CAMP     1,740,920
PARKING MECHANISM
Filed March 30, 1929     2 Sheets-Sheet 2
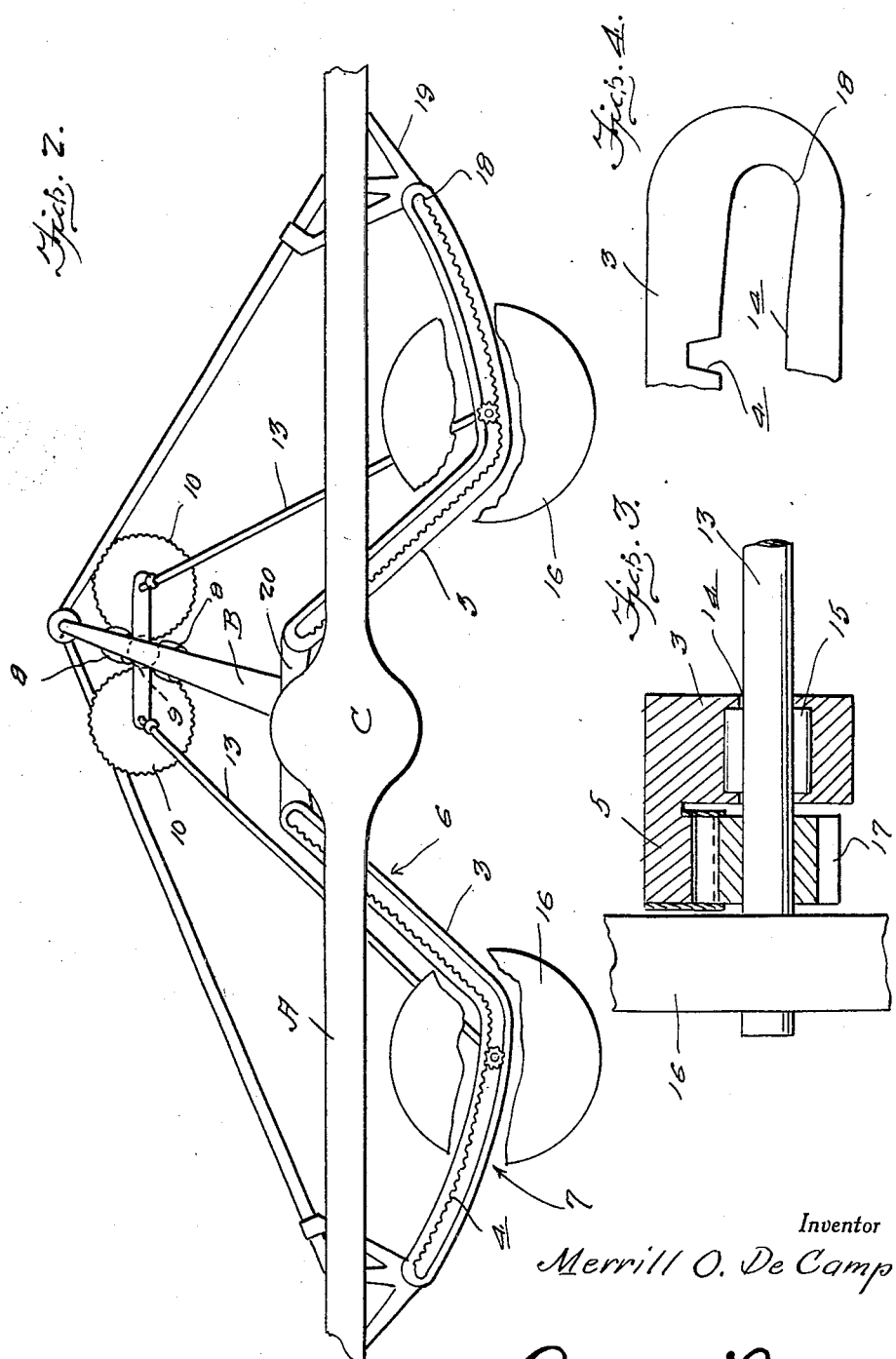
Inventor
Merrill O. De Camp
By Clarence A. O'Brien
Attorney Patented Dec. 24, 1929

1,740,920

UNITED STATES PATENT OFFICE

MERRILL O. DE CAMP, OF JACKSON, MICHIGAN

PARKING MECHANISM

Application filed March 30, 1929. Serial No. 351,437.

The present invention appertains to new and useful improvements in vehicles, and more particularly to a novel mechanism for facilitating the parking of automobiles.

The principal object of this invention is to provide a mechanism operable to permit the parking of an automobile within any confined space in parallelism with respect to a street curbing.

Another important object of the invention is to provide a parking mechanism for automobiles, which will not interfere with the usual function of the vehicle.

Another important object of the invention is to provide a parking device of this character which is capable of being disposed in position for use in a quick and convenient manner.

These and other objects of the invention, will become more apparent to the reader after considering the invention as described and claimed hereinafter.

Referring to the drawings:—

Figure 1 represents a fragmentary top plan view of the rear under portion of an automobile, equipped with the novel parking mechanism.

Fig. 2 represents a fragmentary perspective view of the rear under portion of an automobile equipped with the novel parking mechanism and showing the parking mechanism partly disposed toward operated position.

Fig. 3 represents a fragmentary vertical sectional view through one of the guide members of the invention.

Fig. 4 is a fragmentary side elevation of one of the guide members.

Referring to the drawings wherein like numerals designate like parts, for the purpose of illustrating the application of the present invention, the drawings show the rear axle housing A of a conventional automobile structure, with the drive shaft housing B connected to the usual differential housing C. The particular type of car shown in the invention is a Ford which includes the radius rod D—D. Although the Ford type of automobile is shown in the drawings, the invention is applicable to any type of automobile with but slight modifications within the scope of the invention as claimed hereinafter.

The invention per se, includes a pair of guide bars 3—3. The guide bars are each of L-shape in cross section as is apparent in Fig. 3. Fig. 3 is a sectional view, substantially taken through the guide bar on the left in Fig. 2, in which instance, the rack 4 is provided by forming the lateral portion 5 of the bar with teeth.

Each bar is provided with an incline portion generally referred to by the numeral 6 and the horizontal curved portion generally referred to by the numeral 7. The inclined portions of the guides are converged upwardly intermediately of the differential housing C. The curved portions of the guides are disposed on a continuous curved line having approximately the forward connecting point of the radius rods C—C as the center of its radius.

Mounted forwardly of the rear axle housing A are electric motors 8—8. A pinion 9 on a common armature shaft between the motors 8—8, is interposed between the gears 10—10. Each gear 10 has a stub shaft 11 which is connected by the universal joint 12 to an elongated rod 13 disposed through the block 14 in its corresponding guide bar 4.

The opposed sides of the blocks 14 are grooved to receive roller bearings 15, (shown in Fig. 3). The ends of the rods 13 protrude rearwardly of the guide bars 3 and each has a wheel 16 keyed thereto, and a pinion 17 keyed thereon for mesh with the rack 4. The outer end of each guide bar has the slot 14 curved downwardly as at 18, so that the rod 13 movable in the particular slot, may become seated within this portion of the socket, so that the wheel 16 will not tend to ride inwardly in the guide 3.

The ends of the guide 3 are secured to the radius rods C—C by suitable brackets 19, while the inner ends of the guides are interconnected and secured to the differential housing C by supporting means 20.

When one of the motors 8—8 is energized, the rods 13 are caused to rotate and the pinion 17 riding downwardly in the guide 3 will cause the wheels 16 to engage the ground and the pinions to reach the outer ends of the rack 4.

Obviously through the use of this novel parking mechanism, the vehicle may be easily parked within a confined space without difficulty, and furthermore the employment of the mechanism on a vehicle in any manner will not interfere with the function of its usual parts.

It is to be understood that various changes in the specific shape, and materials, may be resorted to in the construction of the novel mechanism without departing from the spirit or scope of the invention as claimed hereinafter.

Having thus described my invention, what I claim as new is:—

1. A vehicle parking mechanism comprising a pair of slotted guides, rack teeth on said guides, a shaft disposed through each guide, a pinion on each shaft, a wheel mounted on each shaft, and means for rotating said shaft.

2. A vehicle parking mechanism comprising a pair of slotted guides, rack teeth on said guides, a shaft disposed through each guide, a pinion on each shaft, a wheel mounted on each shaft, means for rotating said shaft, said means consisting of an electric motor and inter-geared means between said shaft and the motor.

3. A vehicle parking mechanism comprising a pair of slotted guides mounted in declining position beneath the vehicle, shafts slidably disposed in said guides, wheels on said shafts adapted to support the vehicle when predeterminedly set, and pockets at the lower ends of the slots for receiving said shafts.

In testimony whereof I affix my signature.

MERRILL O. DE CAMP.